(12) United States Patent
Idei et al.

(10) Patent No.: US 7,266,718 B2
(45) Date of Patent: Sep. 4, 2007

(54) COMPUTER SYSTEM FOR RECOVERING DATA BASED ON PRIORITY OF THE DATA

(75) Inventors: Hideomi Idei, Yokohama (JP); Norifumi Nishikawa, Machida (JP); Kazuhiko Mogi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 305 days.

(21) Appl. No.: 10/820,858

(22) Filed: Apr. 9, 2004

(65) Prior Publication Data

US 2005/0193248 A1    Sep. 1, 2005

(30) Foreign Application Priority Data

Feb. 24, 2004  (JP)  ............................. 2004-047176

(51) Int. Cl.
*G06F 11/00*   (2006.01)
(52) U.S. Cl. ........................................................ 714/6
(58) Field of Classification Search .................... 714/6; 707/202
See application file for complete search history.

(56) References Cited

U.S. PATENT DOCUMENTS

| | | | |
|---|---|---|---|
| 5,440,727 A * | 8/1995 | Bhide et al. ................. 711/117 |
| 5,659,614 A | 8/1997 | Bailey, III | |
| 5,966,730 A | 10/1999 | Zulch | |
| 6,553,401 B1 | 4/2003 | Carter et al. | |
| 6,601,187 B1 | 7/2003 | Sicola et al. | |
| 6,728,849 B2 * | 4/2004 | Kodama ...................... 711/162 |
| 6,934,877 B2 * | 8/2005 | Tamatsu ......................... 714/5 |
| 6,980,988 B1 * | 12/2005 | Demers et al. ................. 707/8 |
| 7,003,694 B1 * | 2/2006 | Anderson et al. ............. 714/16 |
| 7,139,851 B2 * | 11/2006 | Fujibayashi .................. 710/58 |
| 2003/0069889 A1 | 4/2003 | Ofek | |
| 2003/0074600 A1 * | 4/2003 | Tamatsu ........................ 714/6 |
| 2003/0115433 A1 | 6/2003 | Kodama | |
| 2003/0177324 A1 | 9/2003 | Timpanaro-Perrottia | |
| 2003/0229764 A1 | 12/2003 | Ohno et al. | |
| 2004/0128356 A1 | 7/2004 | Yamagami et al. | |
| 2004/0230619 A1 * | 11/2004 | Blanco et al. ............... 707/200 |
| 2004/0236984 A1 * | 11/2004 | Yamasaki ...................... 714/6 |
| 2005/0015641 A1 * | 1/2005 | Alur et al. ..................... 714/2 |
| 2005/0177767 A1 * | 8/2005 | Furuya e tla. ................ 714/13 |
| 2005/0210073 A1 * | 9/2005 | Oeda et al. ................. 707/200 |
| 2005/0283504 A1 * | 12/2005 | Suzuki et al. ............... 707/202 |

FOREIGN PATENT DOCUMENTS

JP  2003-006016  1/2003
JP  20036016  1/2003

* cited by examiner

*Primary Examiner*—Bryce P Bonzo
(74) *Attorney, Agent, or Firm*—Mattingly, Stanger, Malur & Brundidge, P.C.

(57) ABSTRACT

In the present invention, there is provided means which sets priorities of DB data for each management unit, means which copies data from a primary site to a secondary site in an order of the data priorities, and means which, when a disaster has occurred in the primary site and recovery of a DB is performed in the secondary site, performs recovery of data in the order of the data priorities to sequentially bring the data to a usable state.

8 Claims, 14 Drawing Sheets

| LUN | BLOCK NUMBER | SERVER ID |
|---|---|---|
| 0 | 20971520 | 0 |
| 1 | 419430400 | 0 |
| 2 | 209715200 | 0 |
| 3 | 209715200 | 0 |
| ⋮ | ⋮ | ⋮ |

200 — table; 210 LUN, 212 BLOCK NUMBER, 214 SERVER ID, 216

| GROUP INFORMATION | DATA PRIORITY | LUN |
|---|---|---|
| 0 | 0 | 0 |
| 1 | 1 | 1, 4, ... |
| 2 | 5 | 2, 5, ... |
| 3 | 3 | 3, 6, ... |
| ⋮ | ⋮ | ⋮ |

202 — table; 220 GROUP INFORMATION, 222 DATA PRIORITY, 224 LUN, 226

FIG. 3

| RAW DEVICE FILE NAME | STORAGE APPARATUS ID | LUN |
|---|---|---|
| /dev/rdsk/c0t0d1s6 | 0 | 0 |
| /dev/rdsk/c2t0d0s6 | 0 | 1 |
| /dev/rdsk/c2t0d1s6 | 0 | 2 |
| ⋮ | ⋮ | ⋮ |

| | 410 | 412 | 414 | 416 | 418 | 420 | |
|---|---|---|---|---|---|---|---|
| | DATA AREA ID | DATA AREA NAME | RAW DEVICE FILE NAME | DATA TYPE | AREA SIZE | DATA PRIORITY | |
| | 0 | LOG | /dev/rdsk/c0t0d1s6 | LOG | 4GB | 0 | 422 |
| | 1 | DB1 | /dev/rdsk/c2t0d0s6 | DATA | 200GB | 1 | |
| | 2 | DB2 | /dev/rdsk/c2t0d1s6 | DATA | 100GB | 1 | |
| | ⋮ | ⋮ | ⋮ | ⋮ | ⋮ | ⋮ | |

| 430 | 432 | 434 | 436 | 438 | |
|---|---|---|---|---|---|
| SCHEMER ID | SCHEMER NAME | SCHEMER TYPE | DATA AREA ID | SCHEMER SIZE | |
| 0 | LO1 | LOG | 0 | 2GD | 440 |
| 1 | TBL1 | TABLE | 1 | 100GB | |
| 2 | IDX1 | INDEX | 2 | 50GB | |
| ⋮ | ⋮ | ⋮ | ⋮ | ⋮ | |

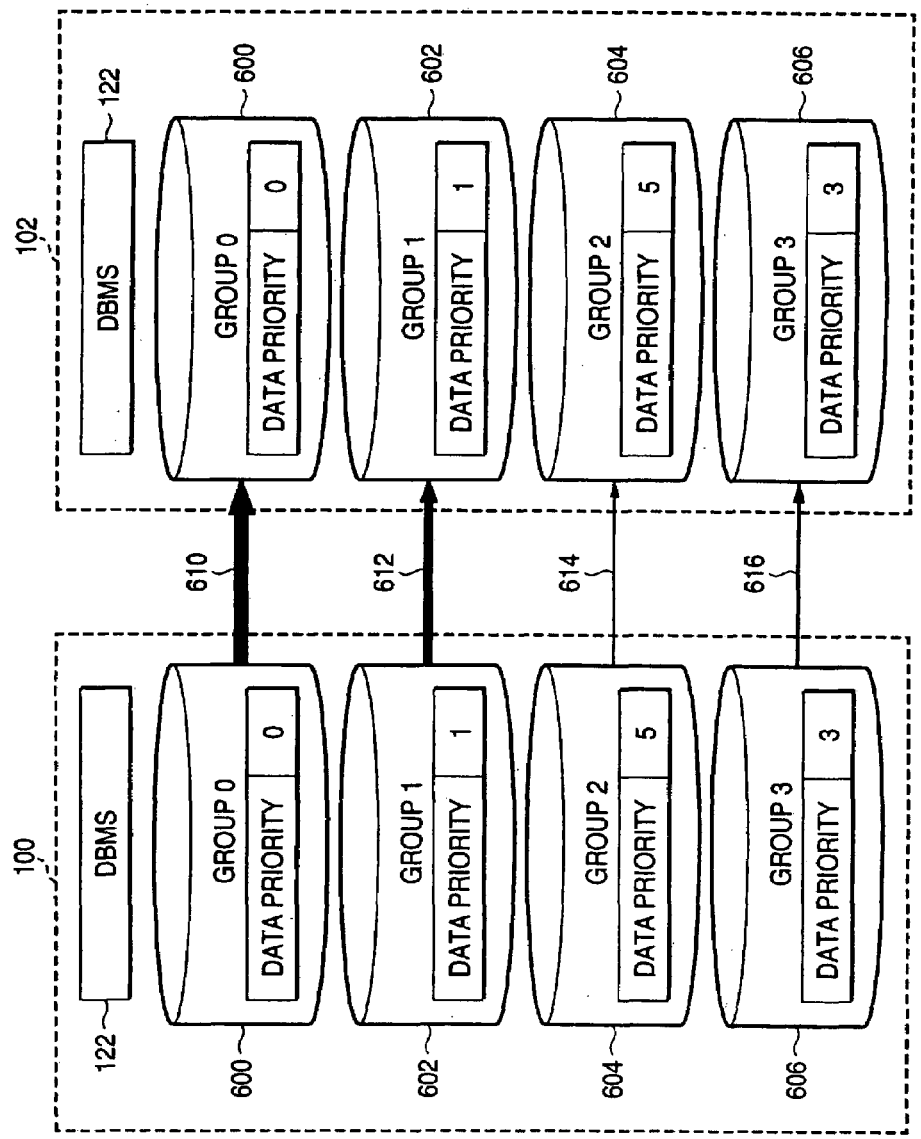

COMPUTER SYSTEM FOR RECOVERING DATA BASED ON PRIORITY OF THE DATA

CROSS-REFERENCES TO RELATED APPLICATIONS

This application relates to and claims priority from Japanese Patent Application No. 2004-047176, filed on Feb. 24, 2004, the entire disclosure of which is incorporated herein by reference.

BACKGROUND OF THE INVENTION

1. Field of the Invention

The present invention relates to a method for data copy between a DB system, which is usually operated in a computer system, in particular, a computer system operating a database (hereinafter referred to as "DB system"), (hereinafter referred to as "currently used system") and a computer system, in which data of the currently used system is copied and used, (hereinafter referred to as "standby system"), and a method for data recovery in the standby system.

2. Description of the Related Art

In a DB system in which a database (hereinafter also referred to as "DB") is established and the DB is operated, as a method of taking backup of data constituting the DB (hereinafter referred to as "DB data"), there is a technique for preparing a DB system, which has the same structure as a currently used system, as a standby system and copying DB data of the currently used system to the standby system.

If the above-mentioned method is used, when the currently used system stops operation due to some reason, availability of the entire system is improved by causing the standby system to operate. In addition, by setting the currently used system and the standby system in physically remote places, respectively, even if a natural disaster such as an earthquake has occurred in the place where the currently used system is set, it becomes possible to recover the DB data in the standby system. A system having such currently used and standby systems will be hereinafter referred to as disaster recovery (DR) system.

In the DR system, data transfer between the currently used system and the standby system may be performed between storage apparatuses storing the DB data. Such data transfer between the storage apparatuses will be hereinafter referred to as remote copy.

As a method for the remote copy, there are two kinds, namely, synchronous remote copy and asynchronous remote copy. In the synchronous remote copy, since update of the DB data is synchronized between the storage apparatus of the currently used system and the storage apparatus of the standby system (identity of contents of the DB data is guaranteed), reliability of the data transferred to the standby system is high. On the other hand, in order to synchronize the DB data, the currently used system is required to wait for a report on completion of processing while the DB data is being transferred to the standby system, and performance of the currently used system declines.

On the other hand, in the asynchronous remote copy, since data is transferred without synchronizing the DB data between the storage apparatus of the currently used system and the storage apparatus of the standby system, contrary to the synchronous remote copy, although performance of the currently used system does not decline much, reliability (or recency) of the data transferred to the standby system declines.

JP-A-2003-6016 discloses a method of giving priorities to each of logical volume groups and executing asynchronous remote copy in accordance with the priorities between storage apparatuses of a currently used system and a standby system. In addition, as an example of the method, the laid-open patent application discloses that a priority of a logical volume, in which a log of a DB is stored, is set high, and the log is transferred to the storage apparatus of the standby system preferentially compared with other DB data.

SUMMARY OF THE INVENTION

In establishing the above-mentioned DR system, time consumed for recovery of DB data in the standby system may be different for each kind of the DB data. However, the conventional technique does not take into account the difference of recovery time and establishes a DR system which performs recovery processing of all the DB data within recovery time for DB data which should be subjected to the recovery processing most preferentially. However, with this technique, it is highly likely that the DR system is over designed, and an optimal system configuration is not realized.

Therefore, the present invention adopts a structure described below. More specifically, when data is copied remotely from a primary site to a secondary site, the data is distinguished (subjected to grouping) in the primary site according to recovery time for data required in the secondary site in advance, an order for transferring the data is determined according to the distinction, and the primary site performs the remote copy. Thereafter, when a failure has occurred in the primary site, recovery of the data is performed in the secondary site on the basis of the groups.

In grouping the data, in the secondary site, the data is subjected to grouping in an order of shortness of time required for data recovery, the primary site transfers the data on the basis of the groups, and in the secondary site, recovery of the data is performed in an order of groups requiring less time for data recovery.

Moreover, regardless of length of time required for the data recovery, log data in a database may be transferred to the secondary site most preferentially. In this case, the log data may be transferred to the secondary site using the synchronous remote copy.

In addition, in recovering the data in the secondary site, it is also possible that all the data are blocked once, and the blocking is released by a unit of recovered group.

BRIEF DESCRIPTION OF THE DRAWINGS

In the accompanying drawings:

FIG. 3 is a diagram showing an example of raw device information 300;

FIG. 6 is a diagram schematically showing remote copy from a primary site 100 to a secondary site 102;

DESCRIPTION OF THE PREFERRED EMBODIMENT

An embodiment of the present invention will be hereinafter described with reference to FIGS. 1 to 14. Note that the present invention is not limited by the embodiment.

Figure 1:
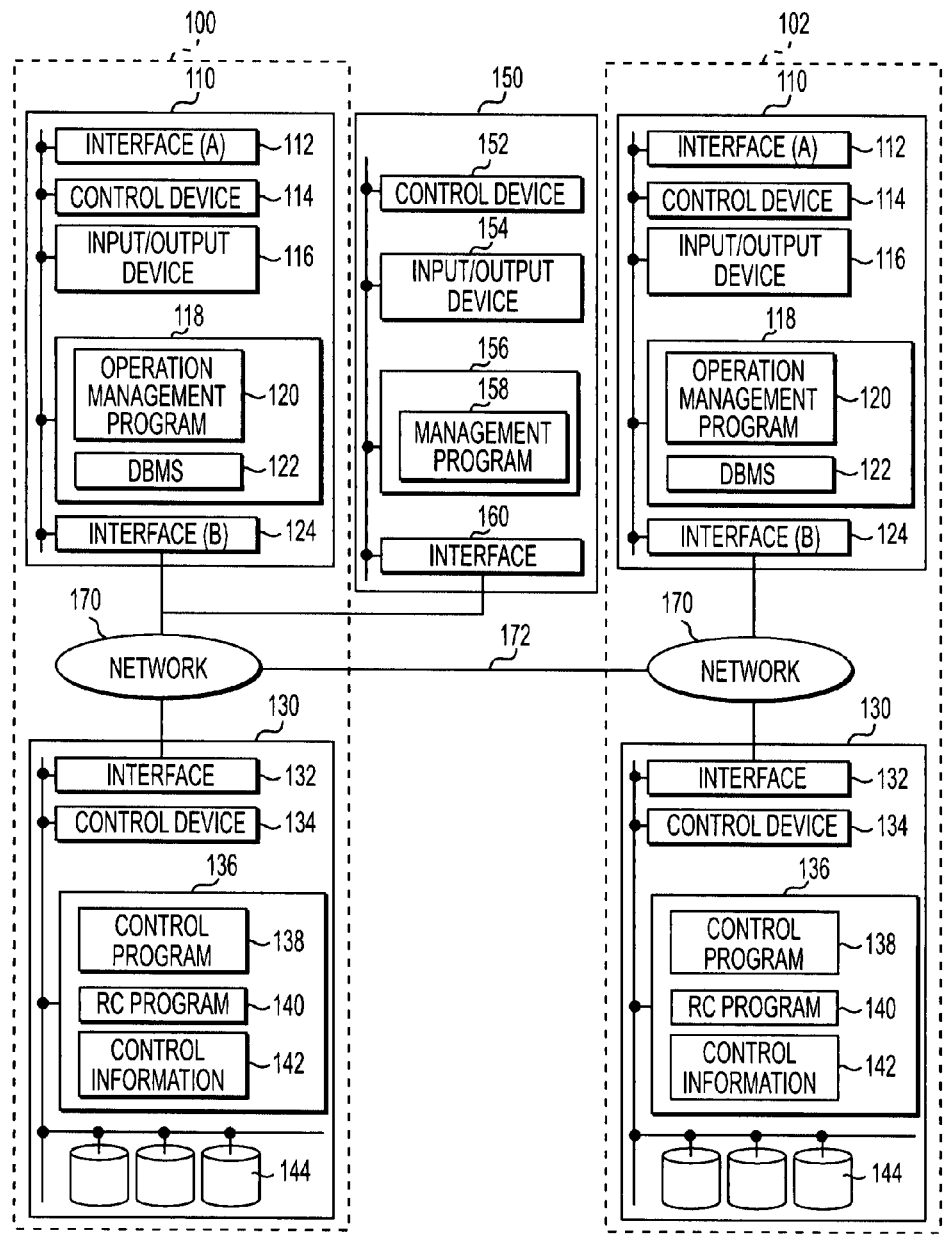
FIG. 1 is a diagram showing an example of a system configuration of a computer system.

FIG. 1 is a diagram showing an example of an embodiment of a computer system to which the present invention is applied.

The computer system includes: a primary site 100 serving as a currently used system; a secondary site 102 serving as a standby system; a network 172 which connects the primary site 100 and the secondary site 102; and a system management server 150 which is used for managing the primary site 100 and the secondary site 102.

The primary site 100 and the secondary site 102 include: DB servers 110 in which a database management system (hereinafter referred to as DBMS) operates; storage apparatuses 130 which store DB data; and networks 170 which connect the DB servers 110 and the storage apparatuses 130 each other. In the description below, it is assumed that apparatus structures of the primary site 100 and the secondary site 102 are the same. However, the structures may not be the same. It is sufficient that both the sites include DB servers and storage apparatuses.

The DB server 110 is a general computer and includes: an I/F (A) 112 which is an interface with a computer used by a user or a network to which the computer is connected; a control device (control processor) 114; an input/output device 116; a memory 118; and an I/F (B) 124 which is an interface with the network 170. In addition, an operation management program 120 and a program for executing the DBMS (hereinafter abbreviated as "DBMS") 122 are stored in the memory 118.

The storage apparatus 130 includes: an I/F 132 which is an interface with the network 170; a control device (control processor) 134; a memory 136; and a disk 144. In addition, a control program 138, a program for executing remote copy (hereinafter referred to as "RC") 140, and control information 142 are stored in the memory 136. Note that the disk 144 is a storage medium, which may be a hard disk or an optical disk. In addition, the storage apparatus 130 may include plural disks 144 in a RAID constitution.

An administrator of the computer system performs setting and management of the computer system using the system management server 150 which is connected to the network 170 in the primary site 100.

The system management server 150 is a general computer and includes: a control device (control processor) 152, an input/output device 154; a memory 158; and an I/F 160 which is an interface with the network 170 of the primary site. Note that a structure in which the system management server 150 and the DB server 110 of the primary site are integrated is also possible. In this case, the management program 158 is executed in the DB server 110.

In addition, the above-mentioned various programs are installed in the respective site using a storage medium such as an optical disk or a floppy disk or installed in the respective devices in the respective site via the networks. In the following description, when a program is a subject of a sentence describing execution of processing, it is actually a control device for executing the program that executes the processing.

Figures 2A, 2B, 2C:
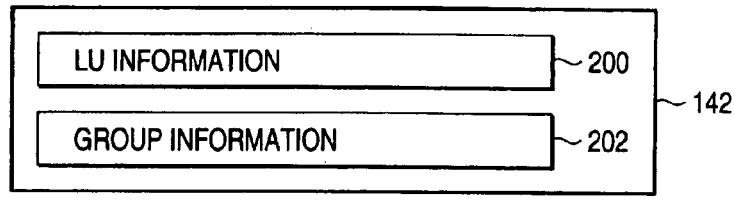
FIGS. 2A to 2C are diagrams showing an example of a structure of control information 140.

FIG. 2A is a diagram showing an example of a structure of control information 142 held by the storage apparatus 130.

The control information 142 includes LU information 200, which is information concerning setting of a logical storage area (logical unit: LU) held by the storage apparatus 130, and group information 202, which is information on groups to be subjected to grouping for each priority of data. Note that the LU is constituted by one or more disks 144.

FIG. 2B is a diagram showing an example of a structure of the LU information 200. The LU information 200 has entries corresponding to respective LUs. Each of the entries includes: a field 210 in which an LUN, which is a number for identifying an LU corresponding to the entry, is registered; a field 212 in which a block number indicating the number of blocks allocated to the corresponding LU is registered; and a field 214 in which a server ID for identifying the DB server 110, to which the corresponding LU is allocated, is registered. Note that a block indicates a unit in handling a storage area and is usually 512 KB.

FIG. 2C is a diagram showing an example of a structure of the group information 202. The group information 202 includes entries corresponding to each of the groups of priorities. Each of the entries includes: a field 220 in which a group ID for identifying a group corresponding to the entry is registered; a field 222 in which a data priority indicating a priority of data in a corresponding group is registered; and a field 224 in which an LUN indicating an LU belonging to the corresponding group is registered.

Figure 3:
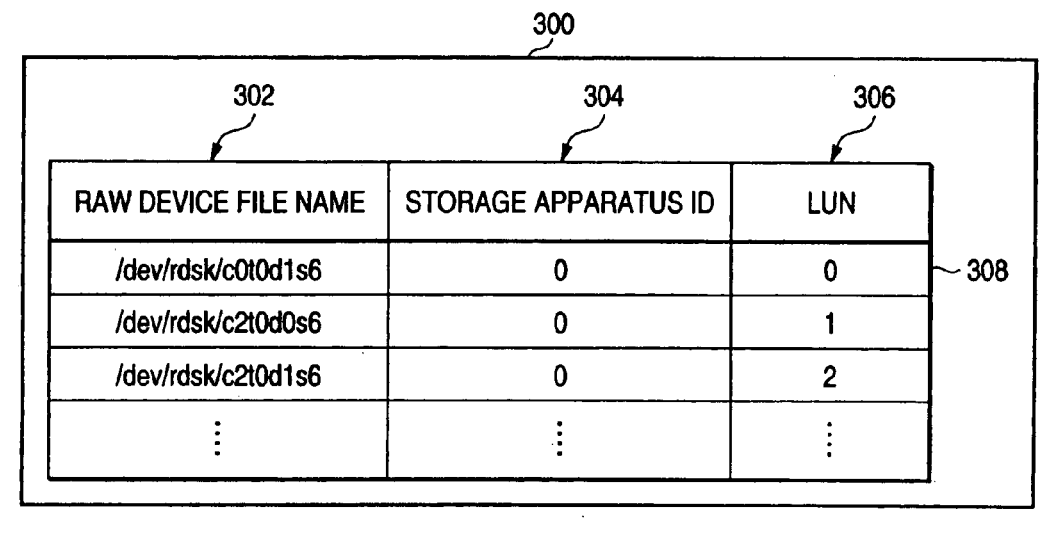

FIG. 3 is a diagram showing an example of raw device information 300 held by the operation management program 120. This raw device information 300 is stored in the memory 118 of the DB server 110.

The raw device information 300 includes entries corresponding to each of raw devices to be registered in the DB server 100. Here, the raw device indicates a virtual external device which is recognized in an operating system, which is executed in the DB server 100, in particular, a file system. The file system represents this raw device as one file and operates the raw device. This is called a raw device file.

Each of the entries includes: a field 302 in which a file name of a raw device file corresponding to the entry is registered; a field 304 in which an identifier of the storage apparatus 130 having an LU, which is associated with a raw device represented by the raw device file, is registered; and a field 306 in which an LUN of an LU corresponding to the raw device is registered.

Figures 4A, 4B, 4C:
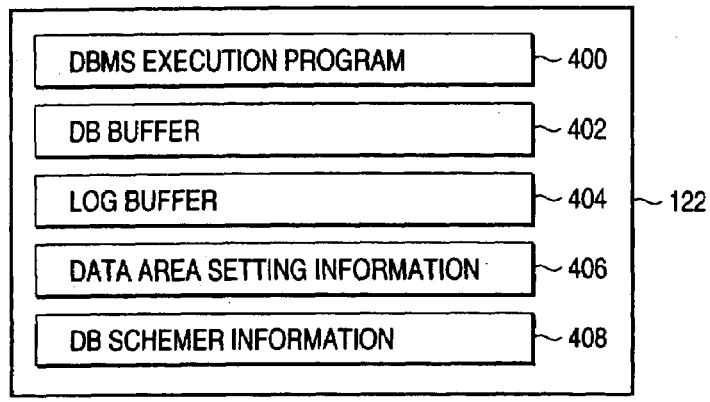
FIGS. 4A to 4C are diagrams showing an example of a structure of a DBMS 122.

FIG. 4A is a diagram showing an example of a structure of the DBMS 122.

The DBMS 122 includes: a DBMS execution program 400; a DB buffer 402 which temporarily holds DB data in reading out or writing the DB data; a log buffer 404 which temporarily holds a log which is added in accordance with update of the DB data; data area setting information 406 which is setting information for a data area in which system information and a log of the DBMS 122, the DB data, and the like are stored; and DB schemer information 408 which is schemer information of the DBMS 122 such as a table and an index.

FIG. 4B is a diagram showing an example of a structure of the data area setting information 406. The data area setting information 406 includes entries corresponding to each of data areas. Each of the entries includes: a field 410 in which data area ID for identifying a data area corresponding to the entry is registered; a field 412 in which a data area name indicating a name of the corresponding data area is registered; a field 414 in which a file name of a raw device file, in which the corresponding data area is created, is registered; a field 416 in which a data type indicating a type of data to be stored in the corresponding data area is registered; a field 418 in which an area size indicating a size of the corresponding data area is registered; and a field 420 in which a data priority indicating a priority of data to be stored in the corresponding data area is registered.

FIG. 4C is a diagram showing an example of a structure of the DB schemer information 408. The DB schemer information 408 includes entries corresponding to each of DB schemers. Each of the entries includes: a field 430 in which a schemer ID for identifying a DB schemer corresponding to the entry is registered; a field 432 in which a schemer name indicating a name of the corresponding DB schemer is registered; a field 434 in which a schemer type indicating a type of the corresponding DB schemer is registered; a field 436 in which a data area ID for identifying a data area, in which the corresponding DB schemer is created, is registered; and a field 438 in which a schemer size indicating a data size of a storage area, which is allocated to the corresponding DB schemer, is registered.

Note that in the case in which the schemer type is "TABLE", table data of a DB is registered in the schemer. In the case in which the schemer type of "INDEX", index data of the DB is stored in the schemer.

Figure 5A:
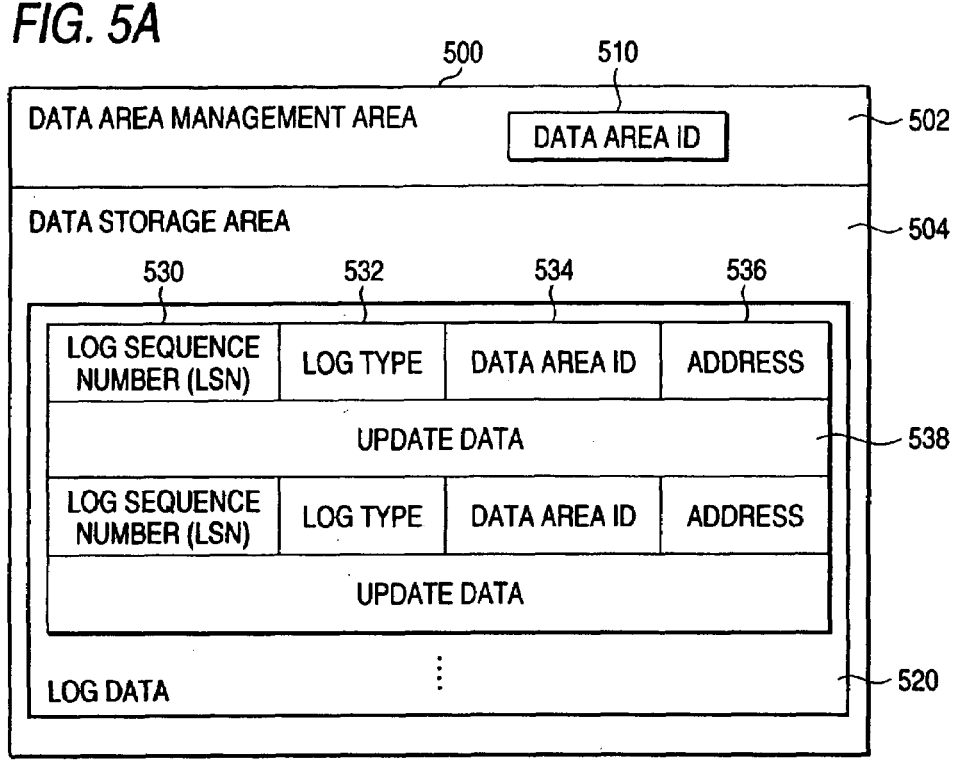
FIGS. 5A and 5B are diagrams showing an example of a structure of a data area.
Figure 5B:
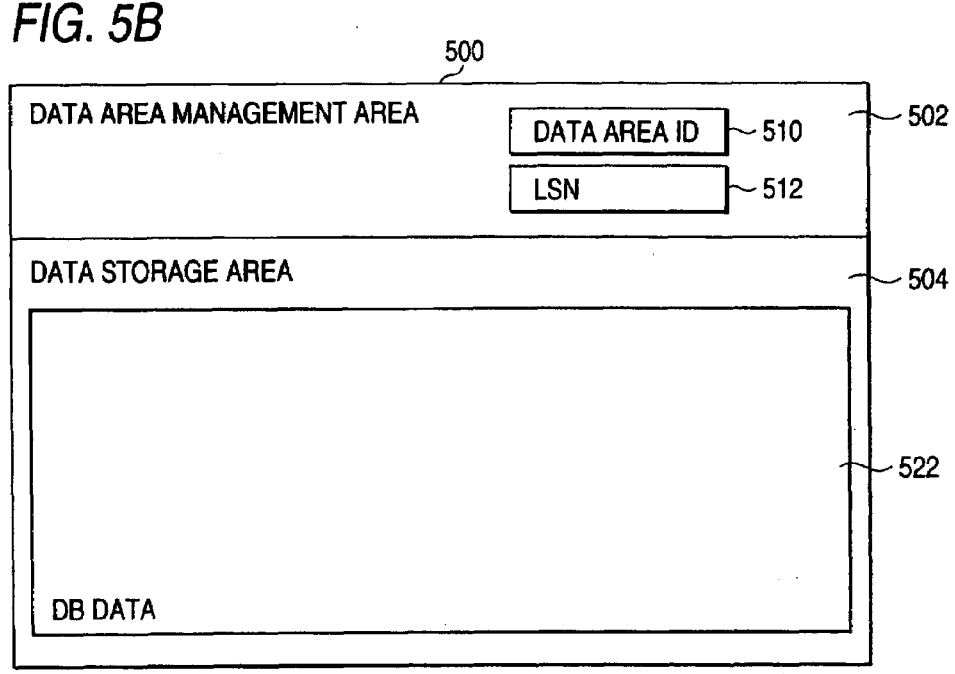

FIGS. 5A and 5B are diagrams showing an example of a structure of a data are a which is created in the storage apparatus 130 by the DBMS 122. As described above, the data area is associated with each LU held by the storage apparatus 130 via a device file name.

A data area 500 includes a data storage area management area 502 in which management information of a data area is stored and a data storage area 504 in which data of an actual DB schemer is stored. The data area management area 502 includes an area in which a data area ID 510 for identifying the data area is stored.

FIG. 5A is a diagram showing an example in which log data is stored in the data area 500. The log data is stored in the data storage area 504. Plural log entries are stored in an area 520 in which the log data is stored. An area for one log entry includes: an area 530 in which a log sequence number (hereinafter referred to as LSN), which is given for identifying a corresponding log entry, is stored; an area 532 in which a log type for identifying a type of a corresponding log is stored; an area 534 in which a data area ID indicating a data area, in which added or updated data is stored, is stored; an area 536 in which an address of data corresponding to the log entry is stored; and an area 538 in which added or updated data contents are stored.

Each entry of this log data is automatically created by the DBMS 122 when data is added to or updated in a DB or when a DB is committed. After being created, this log entry is once held in the log buffer 404. Then, when a storage capacity of the log buffer 404 has become insufficient or when a determined time has elapsed, the DBMS 122 writes the log data held in the log buffer 404 in the data area 500 of the storage apparatus 130.

FIG. 5B shows a case in which DB data is stored in a data area. The DB data is stored in the data storage area 504. When the DBMS 122 has added or updated the DB data, the added or updated DB data is once held in the DB buffer 402. Then, when a storage capacity of a DB buffer has become insufficient or when a determined time has elapsed, the DBMS 122 writes the DB data held in the DB buffer 402 in the data area of the storage apparatus 130.

In addition, the data area management area 502 includes an area 512 in which an LSN of data which has been updated most recently in the data area is stored. For example, in the case in which an LSN of log data, which was created when data of a certain data area was updated, is 10, a value of 10 is stored in the area 512. Consequently, it becomes possible for the DB server 110 to judge that log data up to the LSN 10 is reflected on the data area.

Figure 7:
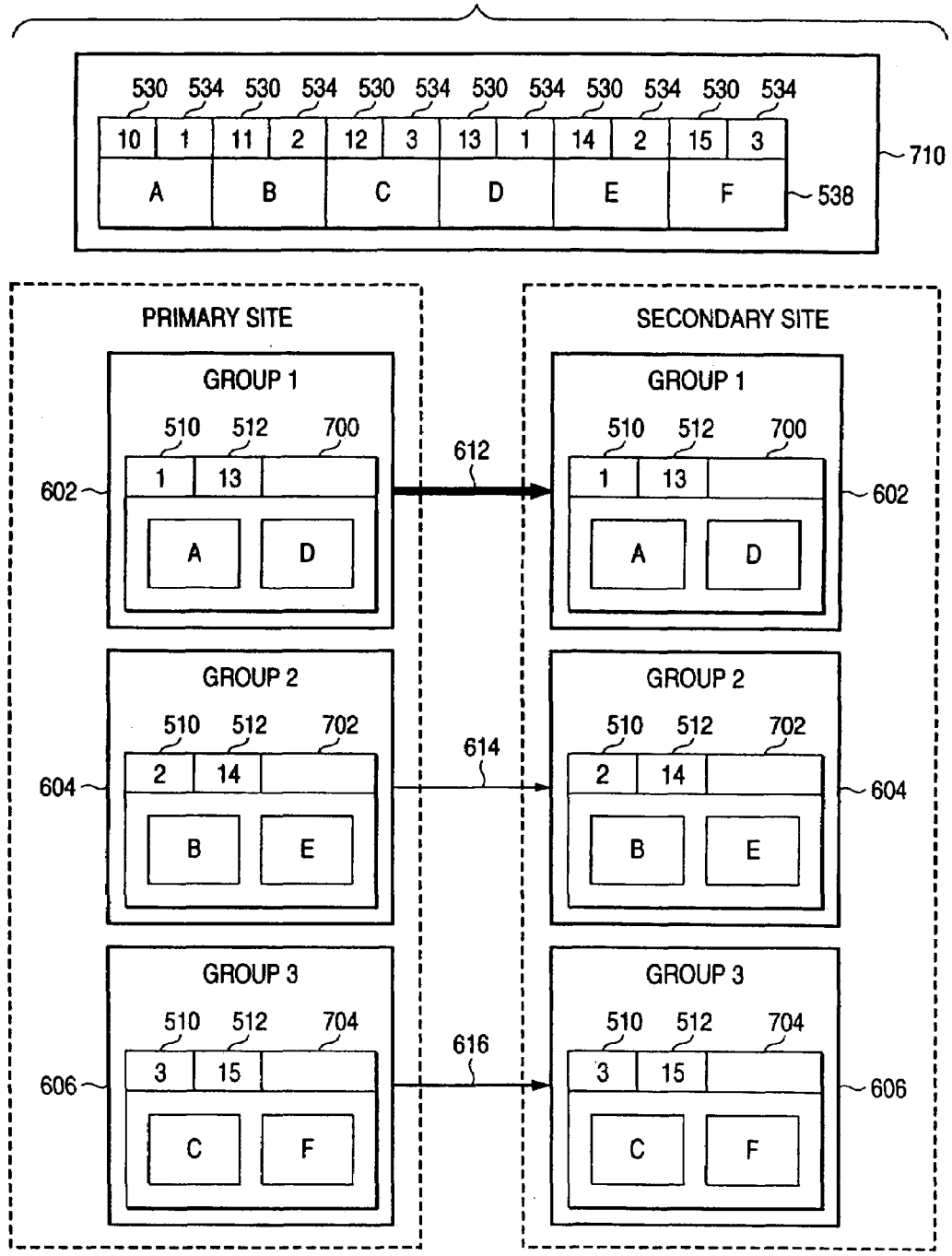
FIG. 7 is a diagram schematically showing remote copy.

FIGS. 6 and 7 are diagrams schematically showing data transfer from the primary site 100 to the secondary site 102 in the computer system.

The storage apparatus 130 executes the RC program 140 and copies data from the primary site 100 to the secondary site 102. This remote copy is performed in an order of priorities by a unit of group. In addition, data of a group for which a priority (also referred to as "data priority") is 0 (log data in this embodiment) is transferred in the synchronous remote copy, and data of a group for which a data priority is other than 0 (DB data in this embodiment) is transferred in the asynchronous remote copy.

In FIG. 6, since a data priority of a group 0 (600) of the primary site 100 is 0, every time data in an LU belonging to this group 0 (600) is updated, the storage apparatus 130 of the primary site 100 transfers data to the storage apparatus 130 of the secondary site 102 in the synchronous remote copy (arrow 610).

On the other hand, in FIG. 6, data priorities of a group 1 (602), a group 2 (604), and a group 3 (606) are 1, 5 and 3, respectively. Therefore, when data in LUs belonging to these groups are copied to the secondary site 102, the storage apparatus 130 of the primary site 100 performs data transfer to the storage apparatus 130 of the secondary site 102 in the asynchronous remote copy (arrows 612, 614 and 616) in an order of the data of the LUs belonging to the group 1 (602), the data of the LUs belonging to the group 3 (606), and the data of the LUs belonging to the group 2 (604).

FIG. 7 is a diagram schematically showing data transfer between primary and secondary sites from a viewpoint of a data area. In the description below, it is assumed that data areas 700, 702 and 704 corresponding to the groups 1, 2 and 3 are constituted in the storage apparatuses 130 of the primary site and the secondary site. Note that it is assumed that the data areas 700 are specific examples of the data area 500. In addition, a group is constituted by LUs belonging to the same priority.

In the case in which data update is performed by the DBMS 122 in an order of data "A" in the data area 700, data "B" in the data area 702, the data "C" in the data area 704, data "D" in the data area 700, data "E" in the data area 702, and data "F" in the data area 704, a log shown in log data 710 (a type of the data area 500) of FIG. 7 is created.

A data area, in which the log data 710 is stored, is created in an LU belonging to the group for which the data priority is 0. Thus, the data is transferred to the secondary site 102 in the synchronous remote copy (arrow 610) every time data is written therein.

The data area 700, the data area 702, and the data area 704 are created in LUs belonging to the group 1 (602), the group 2 (604), and the group 3 (606), respectively. Thus, data is transferred from the primary site 100 to the secondary site 102 in the asynchronous remote copy in an order of data "A" and "D" in the data area 700, data "B" and "E" in the data area 704, and data "C" and "F" in the data area 702 in accordance with data priorities. In addition, when the data is copied from the primary site 100 to the secondary site 102, an LSN of a log corresponding to the data is also transferred to the LSN 512 of the data area management area 502 of the secondary site 102.

FIGS. 8 to 14 are flow diagrams showing an example of a series of processing procedures from setting processing for storage areas to system recovery processing due to occurrence of a disaster in the computer system.

The processing procedures will be described briefly. First, an administrator or the like of the computer system performs setting for storage areas which the computer system uses. In this case, the administrator or the like determines priorities of the storage areas on the basis of an order of priorities based upon recovery time of data in a secondary site and registers information on the priorities in a primary storage apparatus and the secondary site. Thereafter, primary and secondary sites perform remote copy of the data on the basis of the set priorities.

In the case in which a disaster has occurred in the primary site, the administrator attempts recovery of the system in the secondary site. In this case, the computer system in the secondary site performs recovery processing for data in an order of the priorities set in advance. In this case, a storage apparatus of the secondary site once prohibits use of all storage areas and, then, cancels the prohibition of use in order from a storage area for which recovery has been completed. Processing procedures in each step will be described in detail.

Figure 8:
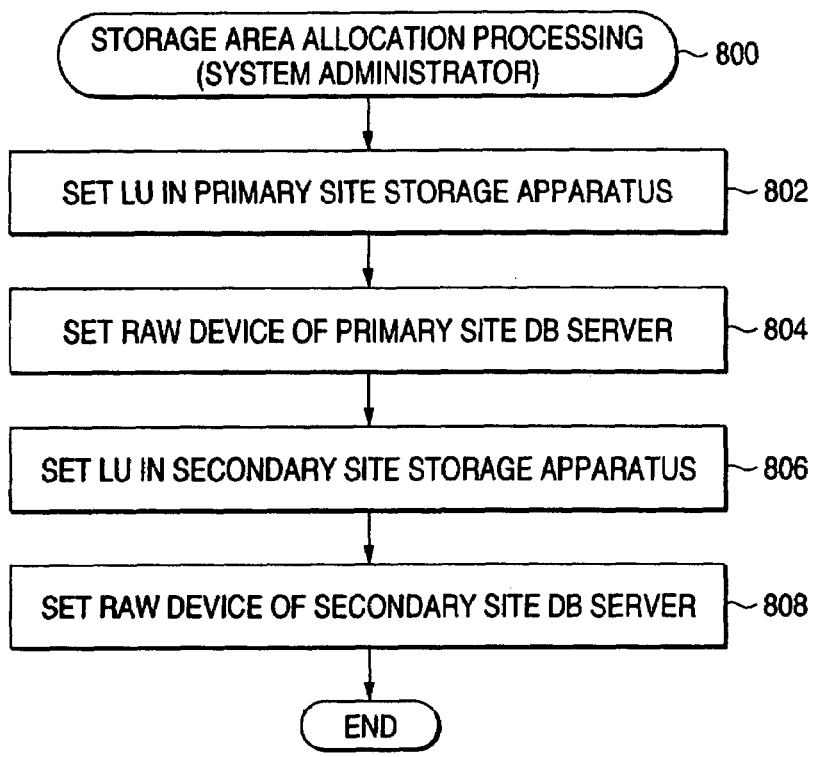
FIG. 8 is a flow diagram showing an example of a procedure for allocation processing for a storage area.

FIG. 8 is a flow diagram showing an example of a procedure for allocation processing for a storage area.

In establishing the computer system, first, the administrator of the computer system starts a management program 158 of the system management server 150 and sets an LU in the storage apparatus 130 of the primary site 100. Contents set here are stored in the LU information 200 held by the storage apparatus 130 via the network. More specifically, for example, an entry 216 of the LU information 200 indicates that the administrator has allocated a 20971520 block to an LU with an LUN of 0 and allocated the LU with the LUN of 0 to the DB server 110 with a server ID of 0 (step 802).

Subsequently, the system administrator sets a raw device on the DB server 110 of the primary site 100. Contents set here are stored in the raw device information 300 held by the DB server 110 via the network. More specifically, for example, an entry 308 of the raw device information 300 indicates that the administrator has associated an LU with an LUN of 0, which is held by the storage apparatus 130 with a storage apparatus ID of 0, with a raw device with a file name of "/dev/rdsk/c0t0d1s6" (hereinafter referred to as "mapping"). Note that an LU, which can be mapped to the raw device, is the LU set in step 802 (step 804).

Subsequently, the administrator sets an LU in the storage apparatus 130 of the secondary site 102. Note that contents of the setting are required to be the same as the contents set in step 802 except a server ID. This is for the purpose of securing consistency between the primary and secondary sites at the time of remote copy (step 806).

Subsequently, the administrator sets a raw device of the DB server 110 of the secondary site 102. Contents of the setting are required to be the same as the contents set in step 804 except a storage device ID. This is also for the purpose of securing consistency between the primary and secondary sites (step 806).

Figure 9:
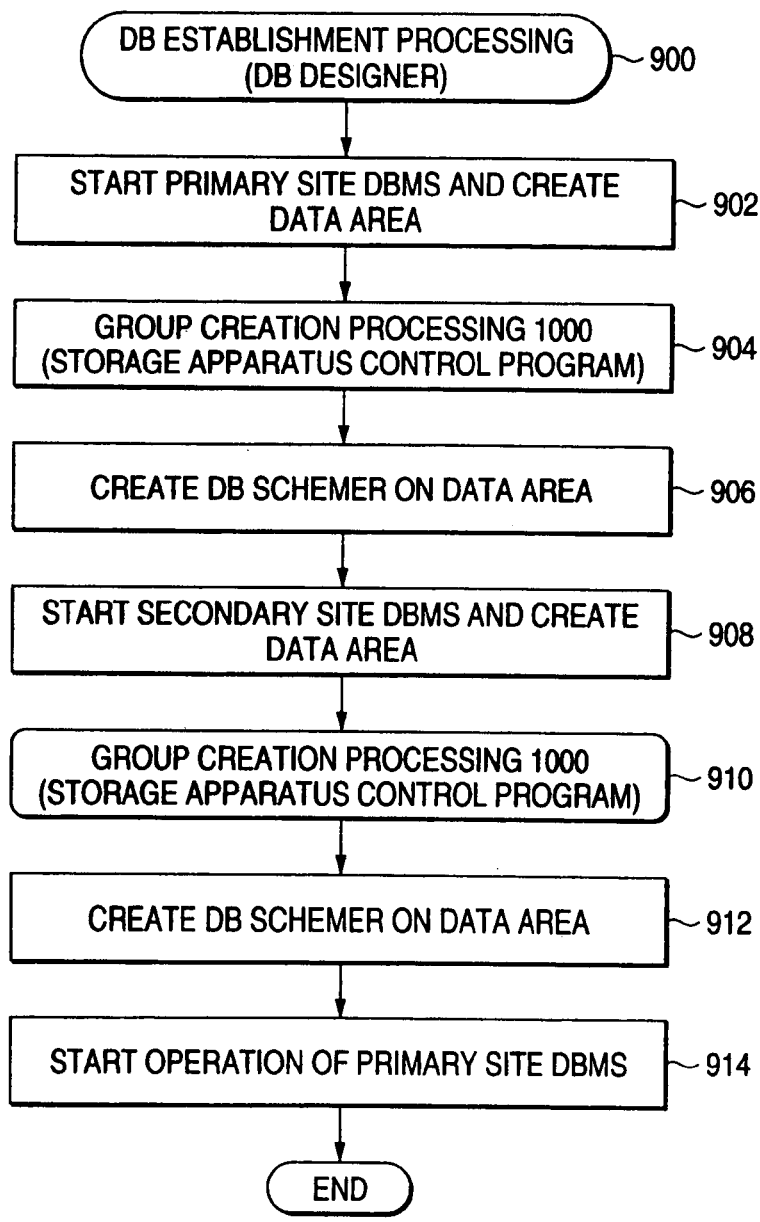
FIG. 9 is a flow diagram showing an example of a procedure for establishment processing for a DB.

FIG. 9 is flow diagram showing an example of a procedure for establishment processing for a DB system in the computer system. This processing is performed after the allocation processing for a storage area.

A DB designer or the like, who establishes a DB, starts the DBMS 122 of the primary site 100, and inputs a query, which designates a name of a data area, a raw device file name of a raw device for which a data area is created, a type of data to be stored in the data area, a size of the data area, and a priority of the data to be stored, from the input/output device 116 to create the data area.

More specifically, priorities of data are determined as described below. First, since log data is indispensable for data recovery in the secondary site 102, a data priority of a data area, in which the log data is stored, is set highest. For other DB data, data priorities are determined in an order of desired recovery in the secondary site 102 at the time when a failure has occurred according to importance of data and contents of DB processing. For example, since DB data of an online system, in which update processing is always performed, is required to be recovered as soon as possible to resume an operation, a data priority for the DB data is set high. Since DB data of a batch system, which is collectively processed at night or the like, is processed in a determined time, a priority for the DB data is set in the middle. Since retrieval/update processing is not performed frequently in DB data of an archive system, a priority for the DB data is set low.

At the point when the data area is created, the DBMS 122 automatically allocates an identifier (ID) to the data area. Contents set here are stored in the data area setting information 406 in the DBMS 122. More specifically, for example, an entry 422 of the data area setting information 406 indicates that an area name of a data area, for which 0 is allocated to a data area ID, is "LOG", and the data area is created on a raw device file "/dev/rdsk/c0t0d1s6". In addition, the entry 422 also indicates that data to be stored in this data area is log data of the DBMS 122, a size of the area is 4 GB, and a priority of the data is 0 (step 902).

After the data area is created in step 902, the DB server 110 sends the raw device information 300 and the data area setting information 406 to the storage apparatus 130 together with a data area setting completion notice. After receiving the data area setting completion notice, the raw device information 300, and the data area setting information 406 from the DB server 110, the storage apparatus 130 executes group creation processing 1000 of the control program 138. The group creation processing 1000 will be described later (step 904).

Subsequently, the DB designer instructs the DBMS 122 to create a DB schemer designating a name and a type of the DB schemer, an ID of a data area in which the DB schemer is created, and a size of the DB schemer on the data area created in step 902. At the point when the DB schemer is created, the DBMS 122 automatically allocates a schemer ID to the DB schemer. Contents set here are stored in the DB schemer information 408 in the DBMS 122.

More specifically, for example, an entry 440 of the DB schemer information 408 indicates that a schemer name with a DB schemer ID of 0 is "LOG1", and the DB schemer is created in a data area with a data area ID of 0. In addition, the entry 440 also indicates that this DB schemer is a schemer in which log data of a DBMS is stored, and a size of the schemer is 2 GB.

Note that, in the case in which plural logs are generated by one DBMS 122, for example, in the case in which the DBMS 122 uses two or more logs by switching the logs, plural data areas for log are created to cope with the case (step 906).

Subsequently, the DB designer starts the DBMS 122 of the secondary site 102 and creates a data area, which is the same as the data area created in step 902, in the secondary site 102 (step 908).

After the data area is created in the secondary site 102 in step 908, the storage apparatus 130 of the secondary site 102 executes the group creation processing 1000 of the control program 138. The group creation processing 1000 will be described later (step 910).

Subsequently, the DB designer creates a DB schemer, which is the same as the DB schemer created in step 906, in the data area created in step 908. Note that, instead of repeating processing, which is the same as the processing in the primary site 100, from step 908 to this step, the data area setting information 406 and the DB schemer information 408 of the primary site 100 may be copied to the secondary site 102 to establish a DB, which is the same as the DB of the primary site 100, on the secondary site 102 (step 912).

Thereafter, an operation of the DBMS 122 of the primary site 100 is started (step 914).

Figure 10:
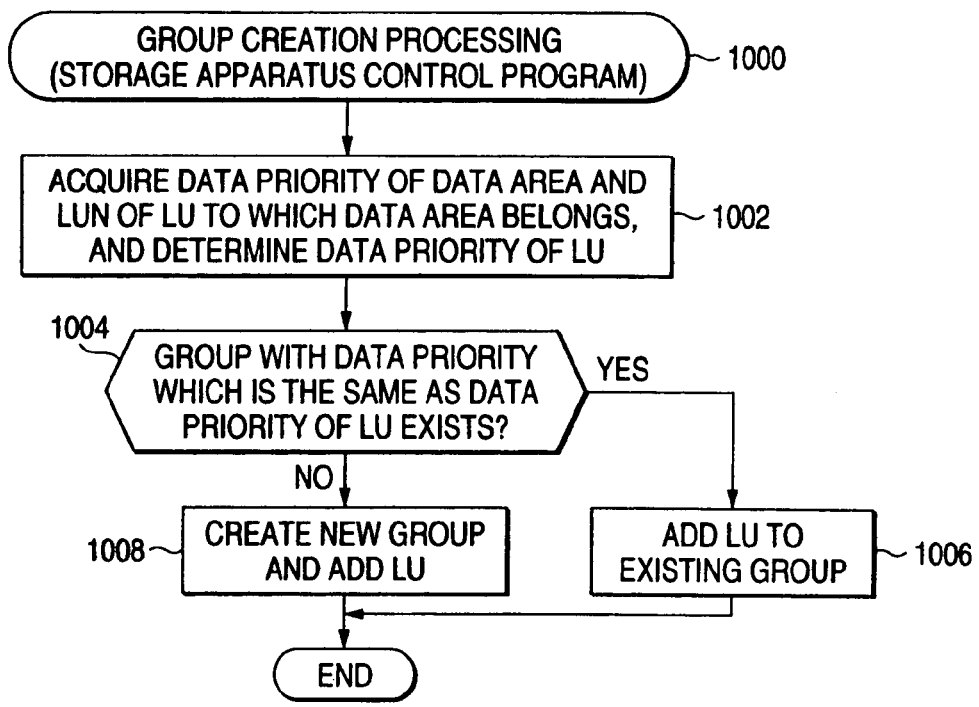
FIG. 10 is a flow diagram showing an example of a procedure for group creation processing.

FIG. 10 is a flow diagram showing an example of a processing procedure for the group creating processing 1000 by the control program 138. Note that, as described above, this processing is executed when a data area is created.

The storage apparatus 130 executes the control program 138, acquires information on a data priority of the created data area and an LUN of an LU, to which the data area belongs, from the raw device information 300 and the data area setting information 406 of the DB server 110, and determines a data priority of an LU corresponding to the LUN (step 1002).

Subsequently, the storage apparatus 130 searches through the group information 202 to find if there is a group with a data priority which is the same as the data priority acquired in step 1002 (step 1004).

In the case in which a group with the same data priority is found in step 1004, the storage apparatus 130 adds the LUN acquired in step 1002 to the group with the same data priority and updates the group information 202 (step 1006).

On the other hand, in the case in which a group with the same data priority is not found in step 1005, the storage apparatus 130 adds a new entry to the group information 202 to create a new group and adds the LUN acquired in step 1002 to a field 244 of the entry (step 1008).

The group information 202 is updated by the above-mentioned steps. More specifically, for example, an entry 226 of the group information 202 indicates that a data priority in a group with a group ID of 0 is 0 and an LU with the LUN 0 belongs to this group.

Figure 11:
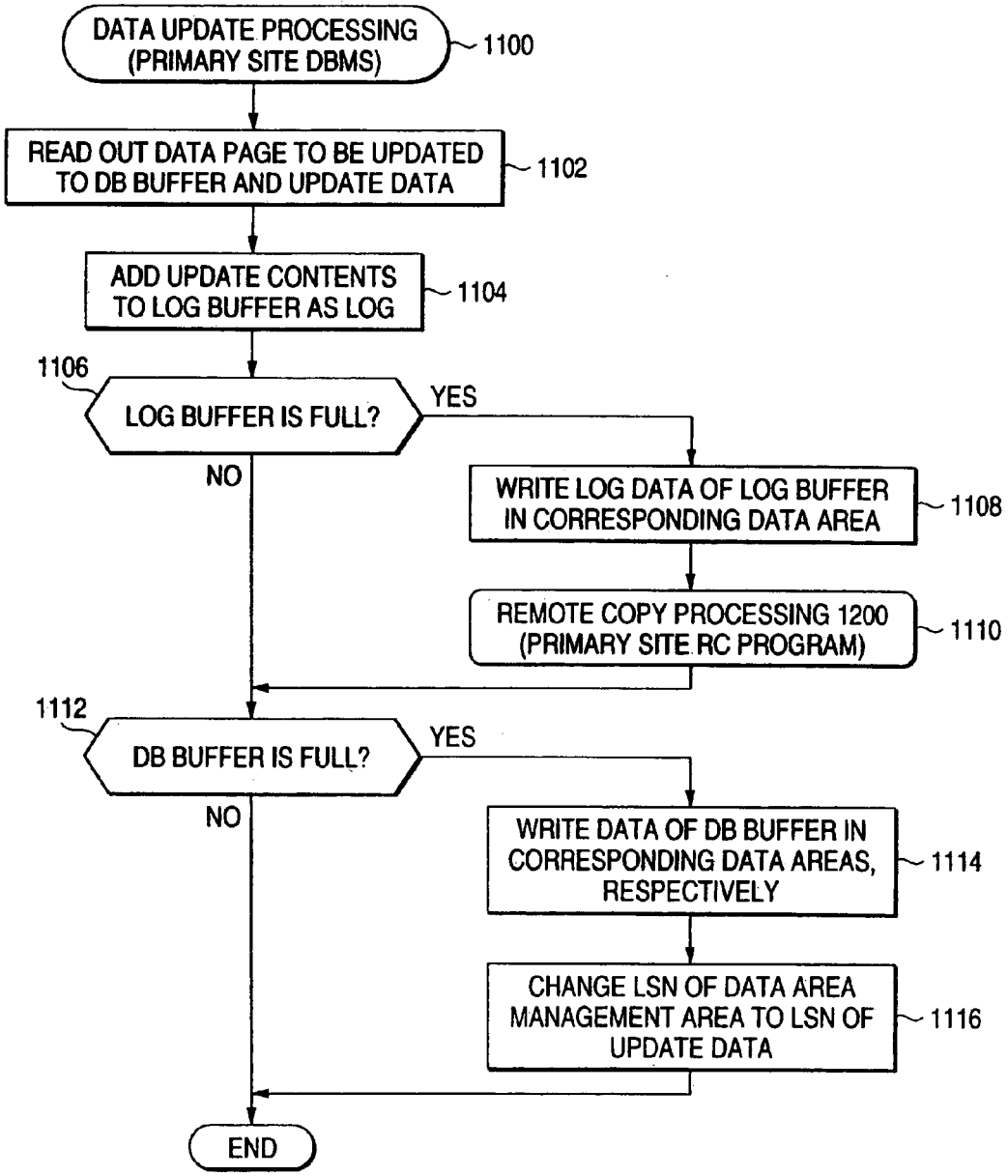
FIG. 11 is a flow diagram showing an example of a procedure for data update processing.

FIG. 11 is a flow diagram showing an example of a procedure for data update processing by the DBMS 122.

The DBMS 122 of the primary site 100 reads out data to be updated from the storage apparatus 130 to the DB buffer 402 and updates the data (step 1102) at the request to process the DB (data update) from the user.

Subsequently, the DBMS 122 writes an LSN, which is given in order to identify the data update, a type of a log, a data area ID of the updated data, an address of the data, and an updated data in the log buffer 404 as one log (step 1104).

Subsequently, the DBMS 122 judges whether or not a space in the storage area of the log buffer 404 is fully used (step 1106). In the case in which there is no space in the storage area of the log buffer 404, the DBMS 122 writes log data in the log buffer 404 in a data area, which is created for log storage, of the data area 500 (step 1108).

In this case, since a data priority of the data area for log storage is 0, the storage apparatus 130 executes the RC program 140 to copy the log data to the secondary site 102 in the synchronous remote copy. Note that remote copy processing 1200 will be described later (step 1110).

Subsequently, the DBMS 122 judges whether or not there is a space in the storage area of the DB buffer 402 (step 1112). If a space in the DB buffer 402 is fully used, the DBMS 122 writes the updated data in the DB buffer 402 in a place indicated by a predetermined address of a corresponding data area (step 1114). In addition, the DBMS 122 stores an LSN of a log, which corresponds to the updated data written in the place, in the LSN 512 of the data area management area 502 (step 1116).

Note that an opportunity for writing log data and DB data in a data area is described as a time when the space in the storage area of the log buffer 404 and the DB buffer 402 is fully used. However, the DBMS 122 may writes log data and DB data in a data area according to another opportunity such as every fixed period rather than presence or absence of a space in the respective buffers.

Figure 12:
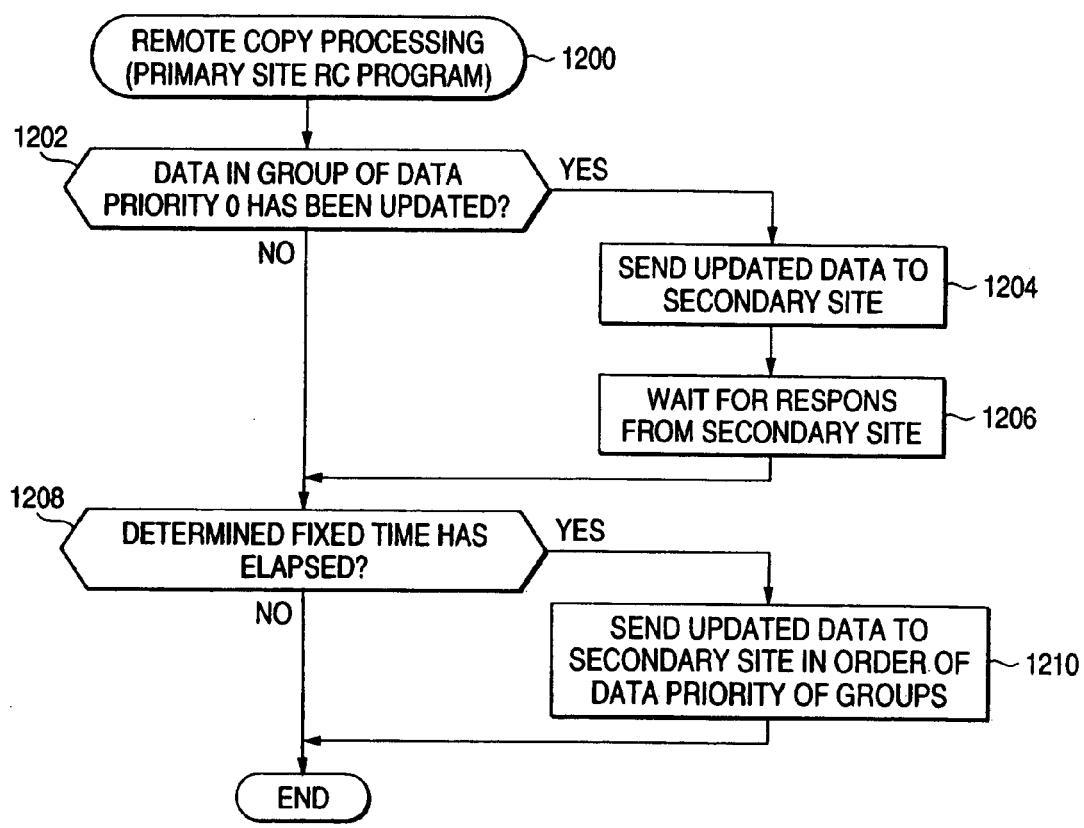
FIG. 12 is a flow diagram showing an example of a procedure for remote copy processing.

FIG. 12 is a flow diagram showing an example of a procedure for the remote copy processing 1200 according to the RC program 140.

In the case in which data of an LU belonging to a group with a data priority of 0 has been updated (step 1202), the RC program 140 of the primary site 100 sends the updated data to the secondary site 102 (step 1204) and waits for a response from the secondary site 102 (step 1206). The RC program 140 of the primary site 100 receives the response from the secondary site 102 to shift to the next processing.

On the other hand, in the case in which the data update in the primary site 100 is other than the data priority 0 or in the case in which data update does not occur, the RC program 140 of the primary site 100 waits for elapse of a determined fixed time (step S1208). After the fixed time has elapsed, the RC program 140 of the primary site 100 searches through the data update, which has been performed with respect to an LU included in a group with a data priority other than 0, and sends the updated data to the secondary site 102 in an order of data priorities of groups (step 1210).

Figure 13:
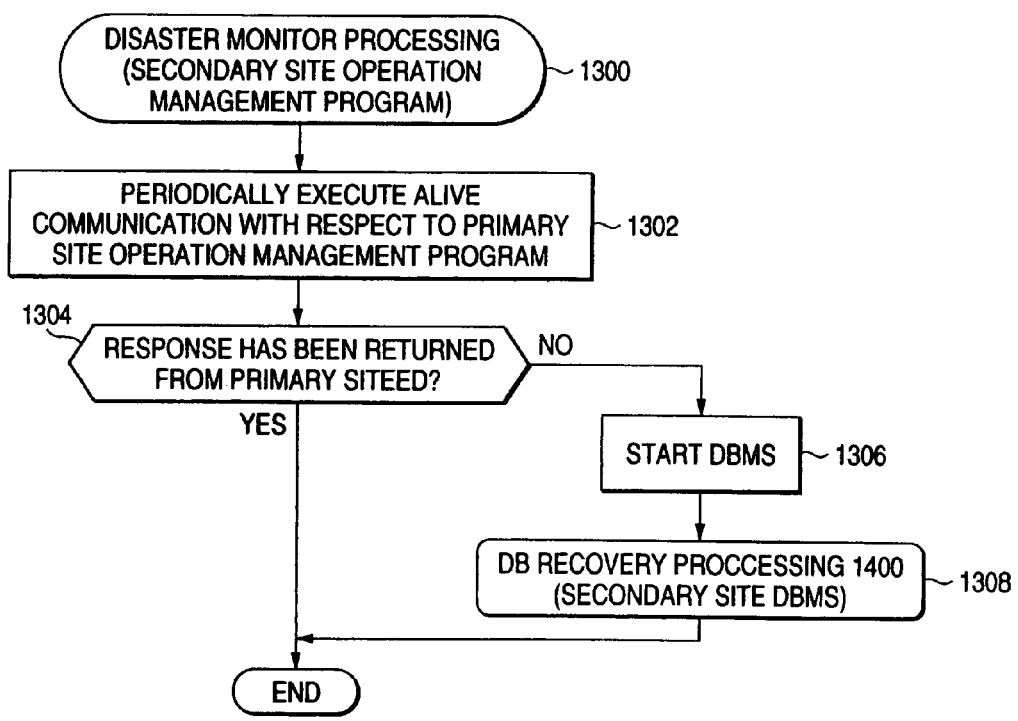
FIG. 13 is a flow diagram showing an example of a procedure for disaster monitor processing according to an operation management program 120 of the secondary site 102.

FIG. 13 is a flow diagram showing an example of a procedure for disaster monitor processing according to the operation management program 120 of the secondary site 102.

The operation management program 120 of the secondary site 102 performs alive communication periodically with respect to the operation management program 120 of the primary site 100. The alive communication is communication which is performed by programs in order to monitor each other. In general, a heart beat signal or the like is used (step 1302).

In the case in which a response to the alive communication of step 1302 is returned from the primary site 100, the secondary site 102 judges that the primary site 100 is operating normally, and repeats the processing from step 1302 after a fixed period.

On the other hand, in the case in which there is no response from the primary site 100, the secondary site 102 judges that a failure or a disaster has occurred in the primary site 100. Then, the operation management program 120 of the secondary site 102 starts the DBMS 122 of the secondary site 102 to start operation (step 1306), and the DBMS 122 executes DB recovery processing 1400. Note that, in this case, the DBMS 122 sets respective data areas, in which DB data is stored, in a blocked state, and sequentially opens the data areas from a data area for which recovery of data has been completed. Here, the "blocked state" means a state in which an application program or the like of the DB server 110 cannot access data of a data area. In addition, "open" means that the blocked state is cancelled to be changed to a state in which the data of the data area is usable by the application programs or the like (step 1308).

Figure 14:
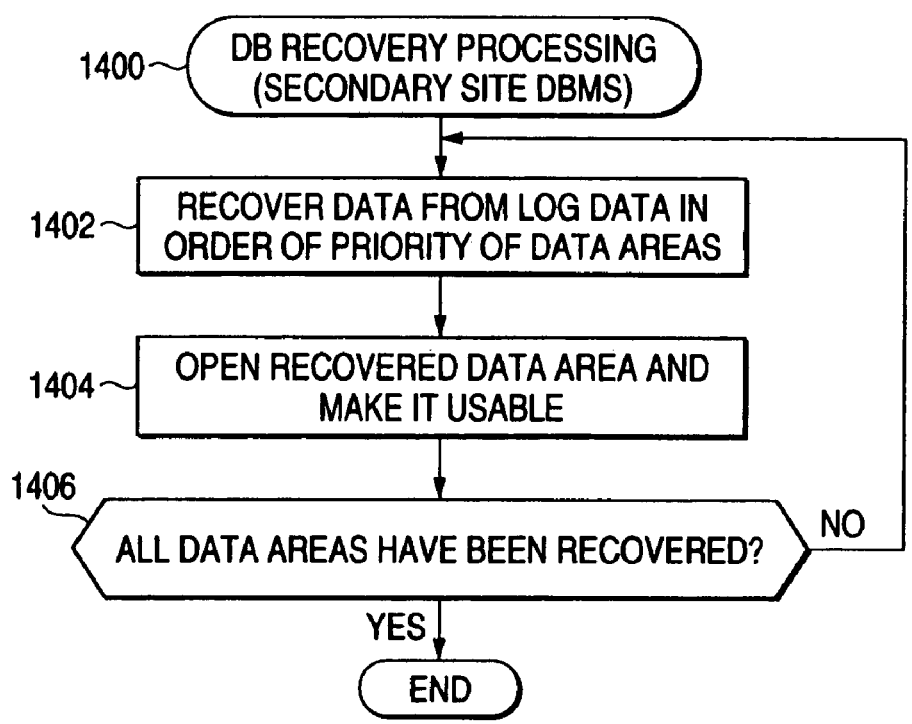
FIG. 14 is a flow diagram showing an example of a procedure for DB recovery processing according to the DBMS 122 of the secondary site 102.

FIG. 14 is a flow diagram showing an example of a procedure for the DB recovery processing 1400 by the DBMS 122 of the secondary site 102.

The DBMS 122 of the secondary site 102 performs recovery of data from a data area with a high data priority with reference to the data area setting information 406 (step 1402) and, when the recovery of the data is finished, opens the data area to bring the data area into a usable state (step 1404).

A procedure for a method of the recovery is as described below. First, the DBMS 122 acquires an LSN of the area 512 in the data area management area 502 of the data area and specifies a log of data which is updated last in the data area. Then, if there is a log indicating that data of the data area has been updated among logs after the log specified by the LSN from the log data copied in the synchronous remote copy, the DBMS 122 updates DB data using updated data stored in an entry of the log.

For example, in the case in which data recovery is performed from a state in which the data "A", "D" and "C" are copied to the respective data area of the secondary site 102 in FIG. 7, an LSN of the data area 700 having a highest data priority is "13", and there is no log indicating data update of the data area 700 in the log data 710 with the LSN of "13" and subsequent numbers. Thus, the DBMS 122 opens the data area 700 as it is and brings the data area 700 into a usable state.

Next, an LSN of the data area 704 having the next highest data priority is "12", and a log with an LSN of "15" of the log data 710 with the LSN of "12" or subsequent numbers indicates update of the data area 704. Therefore, the DBMS 122 writes updated data "F" held by the log with the LSN of "15" in the data area 704 and, after updating an LSN of the area 512 to "15", opens the data area 704 to bring it into a usable state.

Lastly, the LSN 512 of the data area 702 having a lowest data priority is "9", and log with LSNs of "11" and "14" of the log data 710 with the LSN of "9" or subsequent numbers indicate update of the data area 702. Therefore, the DBMS 122 writes updated data "B" held by the log with the LSN of "11" and updated data "E" held by the log with the LSN of "14" in the data area 702 and, after updating the LSN 512 to "14", opens the data area 702 to bring it into a usable state.

Here, a difference in processing for data recovery in the conventional technique and the present invention will be described with reference to FIG. 7.

In FIG. 7, when updated data "A" to "F" are copied from a primary site to a secondary site in remote copy, the data are copied to the secondary site in an order of update of the data in the conventional technique. On the other hand, in the present invention, the data are copied in an order of priorities of data areas in which the data are written. In other words, the data are copied to the secondary site in an order of data "A" and "D" of a group 1 with a highest priority, data "C" and "F" of a group 3 with the next highest priority, and data "B" and "E" of a group 2 with a lowest priority rather than an order of the data "A" to "F".

Here, it is assumed that, when the fourth data is being copied, a failure has occurred in the primary site, and recovery of a DB is attempted in the secondary site. In the conventional technique, the recovery is attempted from a state in which the data "A", "B" and "C" are copied to the secondary site, and the data "D", "E" and "F" are recovered from the log data 716. In other words, it is likely that data requiring recovery exists in any data area, and a recovery time for DB data is extended.

On the other hand, in the present invention, in order to attempt the recovery in an order of data areas belonging to groups with higher priorities from a state in which the data "A", "D" and "C" are copied to the secondary site, the recovery of the data is performed in an order of a data area belonging to the group 1, a data area belonging to the group 3, and a data area belonging to the group 2.

Here, in the present invention, since the data "A" and "D" of the data area 700 belonging to the group 1 have already been copied, a DBMS on the secondary site side is not required to recover the DB data from the log data 710 and can open the data area belonging to the group 1 as it is to bring the data area into a usable state. In addition, since the data "C" of the data area 704 belonging to the group 3 has already been copied, the DBMS on the secondary site side recovers only the data "F" from the log data 710 and, then, opens the data area belonging to the group 3 to bring the data area into a usable state. On the other hand, since the data "B" and "E" of the data area 702 belonging to the group 2 have not been copied yet, the DBMS on the secondary site side recovers the data "B" and "E" from log data 710 and, then, opens the data area belonging to the group 2 to bring the data area into a usable state. According to the procedure described above, in the present invention, it becomes possible to reduce a recovery time for the data areas with higher priorities.

As described above, in the present invention, data of data areas, for which priorities are set high, are copied to the secondary site preferentially, and recovery is attempted from the data of the data areas with higher priorities in attempting recovery of a DB on the secondary site due to a failure or the like, whereby a recovery time for the data of the data areas with higher priorities can be reduced.

In other words, in the present invention, when a failure has occurred in the primary site at a certain point in time, and DB recovery is performed on the secondary site, data with a high recovery priority is highly likely copied on the secondary site compared with data with a low recovery priority. Thus, since it is unnecessary to perform data recovery from a log in this case, a recovery time is reduced.

According to the present invention, it becomes possible to establish an optimal DR system while reducing a recovery time for data with higher priorities in a standby system. In addition, a system with a high effect price ratio can be established while keeping a recovery time for data, which should be recovered most preferentially, for example, DB data, in the standby system short.

What is claimed is:
1. A computer system comprising:
a first storage apparatus located at a first site; and
a second storage apparatus located at a second site operatively connected to the first site via a network;
wherein the first storage apparatus is configured to sort data stored in the first storage apparatus into groups which are each assigned a priority level, and to transfer the sorted data to the second storage apparatus according to the priority, wherein, when a failure occurs in the first storage apparatus, the second storage apparatus transfers the sorted data stored therein, in an order according to the priority levels assigned to the groups, to the first storage apparatus to recover the first storage apparatus, wherein sorted data having a highest priority level is transferred from the second storage apparatus to the first storage apparatus, wherein sorted data having the highest priority level is transferred from the first storage apparatus to the second storage apparatus using synchronous remote copy, and wherein sorted data having priority level other than the highest priority level is transferred from the first storage apparatus to the second storage apparatus using asynchronous remote copy.

2. The computer system according to claim 1, wherein the first storage apparatus sorts the data into the groups based on a recovery time required for recovering data.

3. The computer system according to claim 1, wherein the sorted data is used in a database.

4. The computer system according to claim 1, wherein the second site detects the failure of the first storage apparatus via the network.

5. The computer system according to claim 1, wherein the second storage apparatus restricts use of at least one of the groups in which data to be recovered is included, and allows the use of at least one of the groups when the data in the at least one of the groups is recovered.

6. A computer system comprising:

a first storage apparatus located at a first site; and a second storage apparatus located at a second site operatively connected to the first site via a network;

wherein the first storage apparatus is configured to sort data stored in the first storage apparatus into groups which are each assigned a priority level, and to transfer the sorted data to the second storage apparatus according to the priority, wherein, when a failure occurs in the first storage apparatus, the second storage apparatus transfers the sorted data stored therein, in an order according to the priority levels assigned to the groups, to the first storage apparatus to recover the first storage apparatus, wherein sorted data having a highest priority level is transferred from the second storage apparatus to the first storage apparatus, wherein the sorted data is used in a database, and wherein one of the groups into which the data is sorted includes a log data set, and the one of the groups is transferred from the first storage apparatus to the second storage apparatus in a synchronous remote copy manner.

7. A computer system comprising:

a first storage apparatus located at a first site; and a second storage apparatus located at a second site operatively connected to the first site via a network;

wherein the first storage apparatus is configured to sort data stored in the first storage apparatus into groups which are each assigned a priority level, and to transfer the sorted data to the second storage apparatus, and wherein, when a failure occurs in the first storage apparatus, the second storage apparatus transfers the sorted data stored therein, in an order according to the priority levels assigned to the groups, to the first storage apparatus to recover the first storage apparatus, wherein the sorted data is used in a database, wherein one of the groups into which the data is sorted includes a log data set, and the one of the groups is transferred from the first storage apparatus to the second storage apparatus in a synchronous remote copy manner, and wherein a highest priority level is allocated to the one of the groups in which the log data set is included.

8. A computer system comprising:

a first storage apparatus located at a first site; and a second storage apparatus located at a second site operatively connected to the first site via a network;

wherein the first storage apparatus is configured to sort data stored in the first storage apparatus into groups which are each assigned a priority level based on recovery time required for recovering data of the first storage apparatus, and to transfer the sorted data to the second storage apparatus, wherein, when a failure occurs in the first storage apparatus, the second storage apparatus transfers the sorted data stored therein, in an order according to priority levels assigned to the groups, to the first storage apparatus to recover the first storage apparatus, wherein the sorted data is used in a database, wherein one of the groups into which the data is sorted includes a log data set, and the one of the groups is transferred from the first storage apparatus to the second storage apparatus in a synchronous remote copy manner, and wherein the one of the groups into which the data is sorted has a highest priority level.

* * * * *